Figure 1:
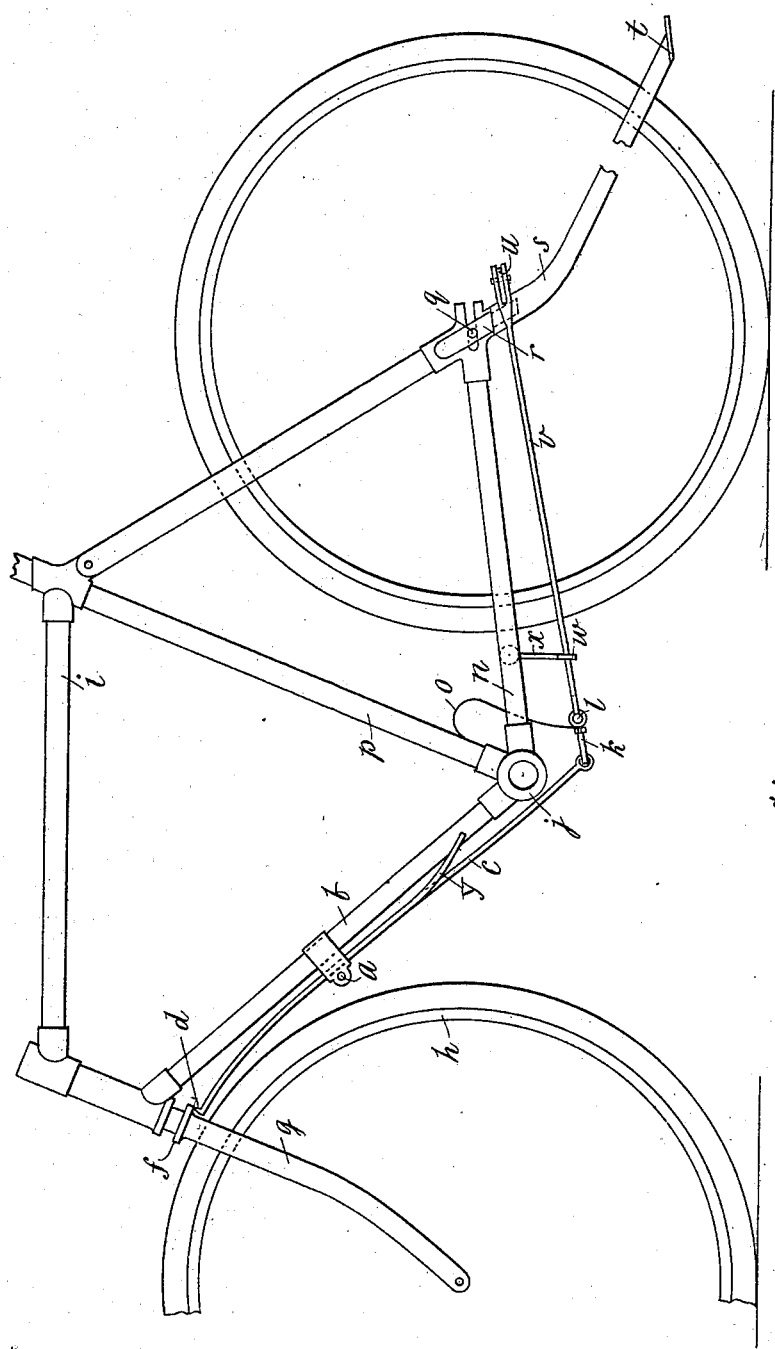

No. 662,506. Patented Nov. 27, 1900.
C. STRIDE.
SUPPORT AND LOCKING DEVICE FOR BICYCLES.
(Application filed June 23, 1900.)

(No Model.) 2 Sheets—Sheet 1.

Witnesses:—
William Crossley
Percy Griffiths

Inventor
Charles Stride
per Hughes & Young
Attorneys.

No. 662,506. Patented Nov. 27, 1900.
C. STRIDE.
SUPPORT AND LOCKING DEVICE FOR BICYCLES.
(Application filed June 23, 1900.)
(No Model.) 2 Sheets—Sheet 2.
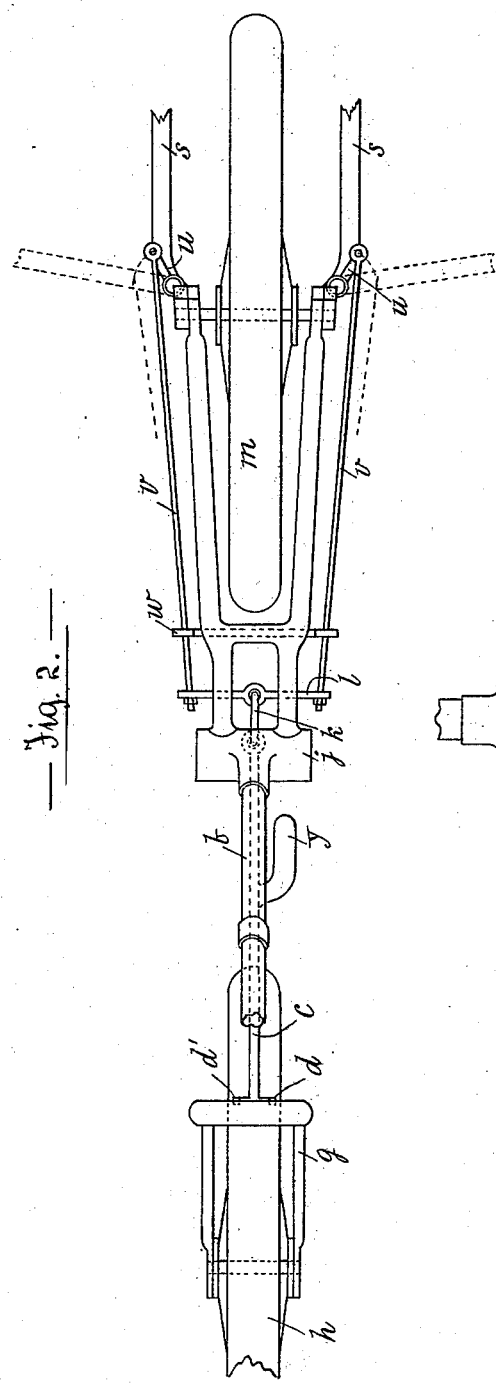
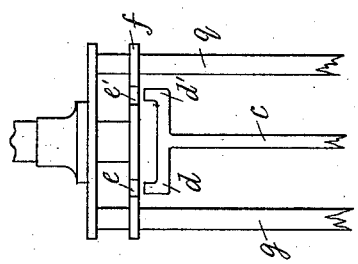
Witnesses:—
William Crossley
Percy Griffiths
Inventor
Charles Stride
per Hughes & Young
Attorneys

UNITED STATES PATENT OFFICE.

CHARLES STRIDE, OF CHICHESTER, ENGLAND.

SUPPORT AND LOCKING DEVICE FOR BICYCLES.

SPECIFICATION forming part of Letters Patent No. 662,506, dated November 27, 1900.

Application filed June 23, 1900. Serial No. 21,390. (No model.)

*To all whom it may concern:*

Be it known that I, CHARLES STRIDE, a subject of the Queen of Great Britain and Ireland, residing at 63 East street, Chichester, in the county of Sussex, England, have invented new and useful Improvements in Supports and Locking Devices for Bicycles, of which the following is a specification.

This invention relates to improvements in supports and locking devices for bicycles, the object being to provide an arrangement whereby by the application of one of the rider's feet the front wheel can be locked and the machine brought to a standstill and supported so that it cannot overturn.

In carrying my invention into effect I proceed in or in about the following manner, making reference to the accompanying drawings, in which—

Figure 1 is a side view of a machine with my invention applied; Fig. 2, a plan of Fig. 1, and Fig. 3 a view of the locking device as seen from the rear.

Pivotally attached at $a$ to the under side of the lower front tube $b$ of the bicycle I provide a lever $c$. This lever $c$ extends upward toward the head of the bicycle and at this end is bifurcated, the bifurcated ends $d\ d'$ being turned upward, so that when the lever $c$ is pushed downward at some point below the pivoting-place $a$ the ends $d\ d'$ will be raised and caused to enter notches $e\ e'$, provided in the bridge $f$ of the steering-fork $g$, and so prevent the front wheel $h$ from deviating from a plane passing vertically through the top tube $i$ and the lower one $b$. The other part of the lever $c$ is continued downward from the pivoting-place $a$ and follows, or more or less so, the slope of the lower tube $b$. Below the crank-bracket $j$ the lever $c$ has hinged to it one end of a comparatively short link $k$, the other end of which is hinged to a cross-bar $l$ in front of the rear wheel $m$ and below the back fork $n$. To the cross-bar $l$ is attached one end of a spring $o$, the other end of which is attached to the diagonal tube $p$ or to the socket of the crank-bracket $j$, which carries the lower end of the said diagonal tube. At each end of the spindle $q$ of the rear wheel $m$ is attached a lug $r$, having a downwardly and rearwardly pointing end of circular cross-section. On the circular end of each lug $r$ is free to turn the tubular end of a bent rod or spur $s$, having a spike or foot $t$ at its outer end. These spurs $s$ can therefore be rotated on the lugs $r$, so as either to be turned outwardly at right angles, or more or less so, to the rear wheel $m$ or so as to lie alongside that wheel.

Near the tubular end of each spur $s$ is a short lever $u$, pointing somewhat rearward when the spur $s$ is turned, so as to lie alongside the rear wheel $m$. To the short levers $u$ are pivoted the outer ends of the connecting-rods $v$, the other ends of which are adjustably attached to the outer ends of the cross-bar $l$. The connecting-rods $v$ may pass through guide-eyes $w$ at the ends of an inverted-T piece $x$, attached to the under side of the back fork $n$. To the lever $c$ and below the pivoting-place $a$ is attached a footpiece $y$ for operating the arrangement.

The action of the parts is as follows: When no downward pressure is applied to the footpiece $y$, the spring $o$ keeps the bar $l$ pushed rearward and the spurs $s$ folded against the sides of the rear wheel $m$, the upwardly-turned ends $d\ d'$ of the lever $c$ being also drawn downward out of the notches $e\ e'$. When, however, downward pressure is applied to the footpiece $y$, the bifurcated ends $d\ d'$ are caused to enter the notches $e\ e'$ and lock the front wheel $h$. Simultaneously the downward and forward pull on the lower part of the lever $c$ draws the connecting-rods $v$ toward the crank-bracket $j$ and causes the tubular ends of the spurs $s$ to turn on the lugs $r$ and the spurs $s$ themselves to be brought forward, so as to stand at right angles, or more or less so, to the sides of the rear wheel $m$ and support the bicycle in an upright position. The curves of the spurs $s$ are such that as they are pushed rearward to fold them against the sides of the rear wheel $m$ they will raise the feet or spikes $t$ from the ground, and on the other hand when they are drawn forward the feet or spikes $t$ approach and finally rest on the ground.

What I claim as my invention, and desire to secure by Letters Patent, is—

In supporting and locking devices for bicycles, a lever pivoted to the under side of the bottom tube of the bicycle: a footpiece to enable downward pressure to be applied to the said lever below its pivoting-place: means for locking the front wheel by the upward action of upper end of said lever: a cross-bar below and free of the back fork: a link connecting the said cross-bar to the bottom end of the said lever: a spring connecting the said cross-bar to the crank-bracket: circularly-cross-sectioned lugs below the outer ends of the back fork: spurs with tubular ends to turn on the said lugs: rearwardly-pointing short levers on the said spurs: connecting-rods pivotally attached at one end to the short levers on the spurs and adjustably attached at the other end to the ends of the said cross-bar, and guides for the said connecting-rods, all substantially as described in the above specification, and exemplified by the accompanying drawings.

In testimony whereof I have signed my name to this specification in the presence of two witnesses.

CHARLES STRIDE.

Witnesses:
EDWARD KING,
HENRY EDWARD LUCK.